Nov. 8, 1960     S. VARNADORE ET AL     2,959,266
PORTABLE CHICKEN HOUSE AND BARN CLEANER
Filed Aug. 7, 1959     2 Sheets-Sheet 1

INVENTORS
SHAFTER VARNADORE,
CLIFFORD E. MOTTE,
BY

McMorrow, Berman & Davidson
ATTORNEYS.

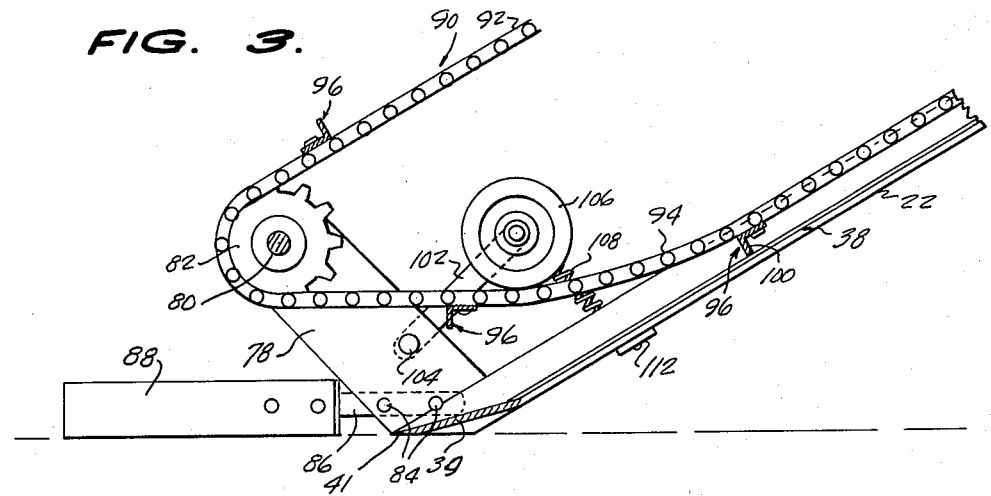
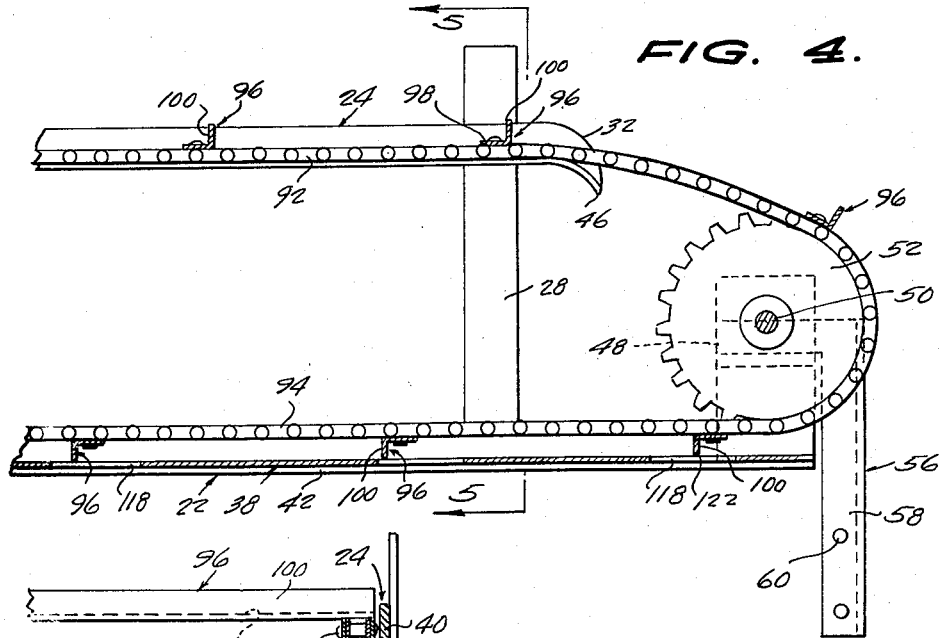
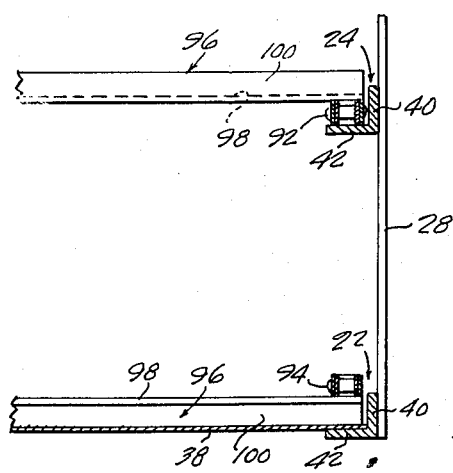

2,959,266
PORTABLE CHICKEN HOUSE AND BARN CLEANER

Shafter Varnadore, Rte. 1, Nicholls, Ga., and Clifford E. Motte, 515 9th St., Alma, Ga.

Filed Aug. 7, 1959, Ser. No. 832,362

4 Claims. (Cl. 198—7)

This invention relates to a portable cleaner for chicken houses and stock barns, to be mounted on vehicles such as farm trucks and spreaders.

The primary object of the invention is to provide a portable device of the kind indicated which eliminates the need for cleaning apparatus installed permanently in each chicken house or barn, the need for shovelling and handling material to such apparatus, together with the expenditure of time, labor, installation and maintenance of such apparatus.

Another object of the invention is the provision of a device of the character indicated above which is devised to be moved from one chicken house or barn to another, to clean, in succession, any number thereof, the said device having conveyor means designed to be reached, by moving its carrying vehicle, to corners and other areas of the floors or barns or chicken houses, so as to render unnecessary the handling of material, as by shovelling, for the cleaning out thereof.

A further object of the invention is to provide a simple and relatively inexpensive self-powered device of the character indicated above, which is readily mounted on a vehicle, such as a truck or spreader, for clean-out operations, and is readily removable therefrom so as not to encumber the vehicle when used for other purposes.

Other important objects and advantageous features of the invention will be apparent from the following description and the accompanying drawings, wherein, for purposes of illustration only, a specific form of the invention is set forth in detail.

In the drawings:

Figure 3 is an enlarged fragmentary vertical longitudinal section taken on the line 3—3 of Figure 2;

Figure 4 is an enlarged fragmentary vertical longitudinal section taken on the line 4—4 of Figure 2; and Figure 5 is a fragmentary vertical transverse section taken on the line 5—5 of Figure 4.

Figure 2:
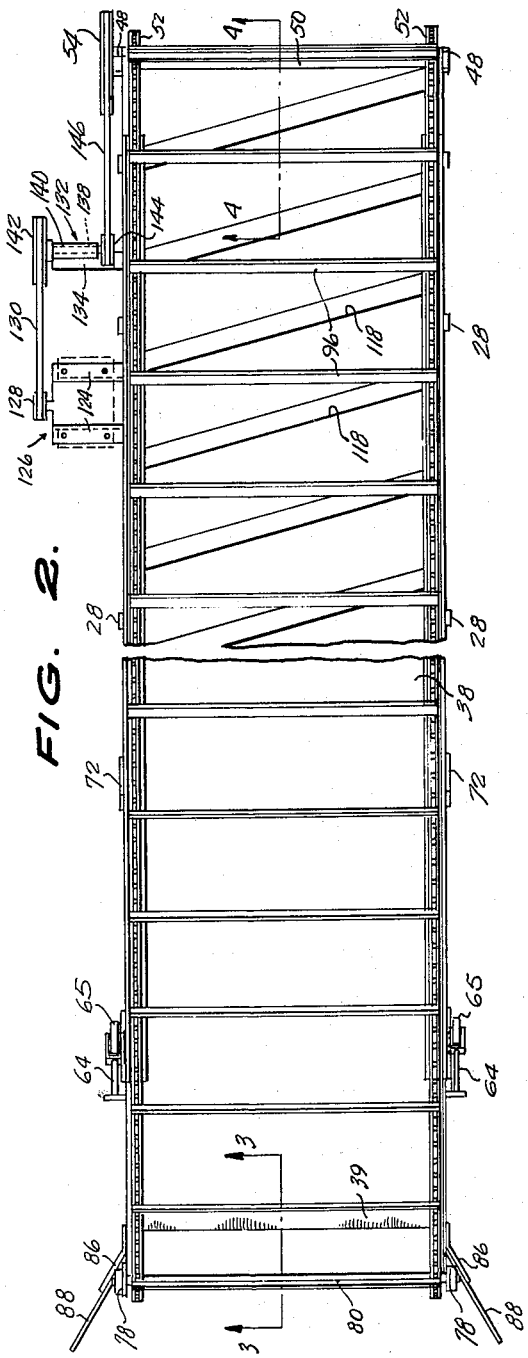
Figure 2 is a contracted top plan view of the device of Figure 1.

Referring in detail to the drawings, wherein like numerals designate like parts throughout the several views, the illustrated device, generally designated 10, comprises a longitudinally elongated frame 12, having a horizontal portion 14, and a declining portion 16. The horizontal frame portion 14 is to be mounted on a suitable vehicle 18, with the declining frame portion 16 extending downwardly relative to the portion 14 and relative to supporting means, such as the open body or bed 20 of the truck.

The frame 12 comprises laterally spaced lower side members 22 which extend the full length of the frame, and laterally spaced upper side members 24, which are aligned with and spaced parallel above the lower side members 22. The side members are laterally spaced from each other and braced by upper cross members 26 secured thereto at longitudinally spaced intervals along the frames 12, and related side members are vertically spaced from each other by vertical members 28 secured thereto, at greater longitudinal intervals. The upper side members 24 are shorter than the lower side members 22 and having first and second ends 30 and 32, respectively, which are spaced longitudinally inwardly from the first and second ends 34 and 36, respectively, of the lower side member 22. A bottom plate 38 extends between the lower side members 22, and has on its depressed end a declining elevating plate 39 having a ground-engaging lower edge 41.

As seen in Figure 4, the upper and lower side members 22 and 24 are preferably in the form of angle irons having vertical flanges 40 and horizontal flanges 42 which extend laterally inwardly toward each other, and serve as chain guides and supports. The first and second ends 30, 32 of the upper side members 24 are downwardly curved, as indicated at 44 and 46, respectively, to ease the chains thereonto.

Fixed to and rising about the lower side members 22 near their second ends 36 are brackets 48 in which related ends of a transverse chain driving shaft 50 are journalled, which has fixed thereon, in line with the frame side members, large sprocket wheels 52, and on one end, outside of a related bracket 48, a large V-type pulley wheel 54. The same brackets 48 have fixed thereon L-shaped frame-mounting brackets 56 which have depending uprights 58 which extend below the lower side members 22, and are adapted to be suitably fixed, as indicated at 60, to portion of such as a truck bed or body 20. The shaft 50 is located on a level between the lower and upper frame side members 22 and 24, and is spaced removably from the second ends 36 of the upper side members 22, and are vertically spaced nearer to the lower side members than to the upper side members. The shaft 50 and the brackets 48 constitute the pivot on which the frame 12 is adapted to be hinged, in order to elevate and depress the frame 12 relative to the ground G, as represented by the chicken house or barn floor to be cleaned. In a depressed position of the frame 12, this being a fully depressed operative position of the frame, the horizontal frame portion 14 rests upon the truck bed 20, but is spaced upwardly therefrom by depending cross members 62, which are secured to the lower cross members 22 at a midlength point of the horizontal frame portion 14.

For elevating and depressing the frame 12, a wheel fork 64 is pivoted at its upper end, as indicated at 66, to the underpart of the declining frame portion 16 and carries a ground-engaging wheel 65 on its lower end. A cable 68 is suitably connected to the fork 64, at a point above its pivot 66, and leads inwardly and is wound around a winch drum 70 which is journalled on a bracket 72, depending from the frame portion 16, and is provided with an operative hand crank 74. Winding of the cable 68 on the drum 70 erects the fork 64 and elevates the frame 12 on the axis of the shaft 50. A longitudinally and diagonal brace structure 76 extends between and is fixed to underparts of the frame portions 14 and 16.

Fixed on the first ends 34 of the lower side members 22 are upstanding standards 78, substantially at right angles thereto, in whose upper ends related ends of a chain carrying shaft 80 are journalled. The shaft 80 has fixed thereon, adjacent to the standards 78 relatively small sprocket wheels 82. Fixed, as indicated at 84, to the lower ends of and extending outwardly from the standards 78, are arms 86, to whose outer ends are vertically fixed divergent, horizontal material converging plates 88, which act to force material laterally inwardly to the frame 12, as the frame is advanced over a floor to be cleaned.

Trained around related driving shaft sprocket wheels 52 and carrying shaft sprocket wheels 82 are endless chains 90, having upper flights 92 riding on the horizontal flanges 42 of the upper frame side members 24, and lower flights 94. The chains have fixed on their outer sides, at longitudinally spaced intervals, angle iron cleats or raddles 96, which have horizontal flanges 98 secured to the chains and right angular vertical flanges 100 extending away from the outer sides of the chains.

For tightening the chains 90, levers 102 are pivoted at 104 at one end to lower parts of the standards 78 and extend inwardly therefrom above the lower chain flights 94 and carry idler wheels 106 on their inward ends, which bear downwardly upon the upper sides of the lower flights 94, the wheels 106 being biased downwardly by contractible springs 108 which are secured to the shaft 110 on which the wheels are mounted, and to the lower frame side members 22, as indicated at 112.

As seen in Figure 5, the lower chain flights 94 do not slide directly upon the horizontal flanges 42 of the lower side members 22, but instead the lower edges of the raddle flanges bear upon the bottom plate 38 which extends between the lower side members 22 and is suitably secured to their horizontal flanges 42. The bottom plate 38, in the area of the horizontal declining frame portion 16 is imperforate, but in the area of the horizontal frame portion 14, the bottom plate 116 is formed with material discharging openings, preferably in the form of longitudinally spaced, diagonal slots 118, for discharging material onto the truck bed 20, which can be a hopper type of truck body. In order to avoid undesirable frictional contact of the raddle flanges 100 of the lower chain flights 94 upon the upper surface 120 of the bottom plate 38, the lower edges 122 of the flanges 42 run close to but are not in heavy contact with the upper surface 120. The slots 118 are diagonally arranged in the bottom plate 116 so that the raddles of the lower chain flight 94 are continuously supported in their passage along the bottom plate 116 and cannot drop into the slots 118, as would be the case with straight across slots.

Disposed at one side of the horizontal frame portion 14, at a point longitudinally inwardly of the driving shaft 50, are extensions 124 of the cross members 62 upon which a suitable motor 126 is mounted, which has a shaft pulley 128 over which is trained a V-belt 130. At a location in line with the motor 126 and between the motor and the shaft 50, an intermediate pulley assembly 132 is mounted on an extension 134 of an angle bar 136 which is secured to underparts of the lower frame side members 22. The assembly 132 comprises an upstanding upright 136 across whose upper end a shaft 138 is journalled, as indicated at 140, which carries a large pulley 142 in line with the motor pulley 128 and over which the belt 130 is trained. A smaller pulley 144 on the other end of the shaft 138 is operatively connected to the large pulley 54 on the shaft 50 by a V-belt 146.

Figure 1:
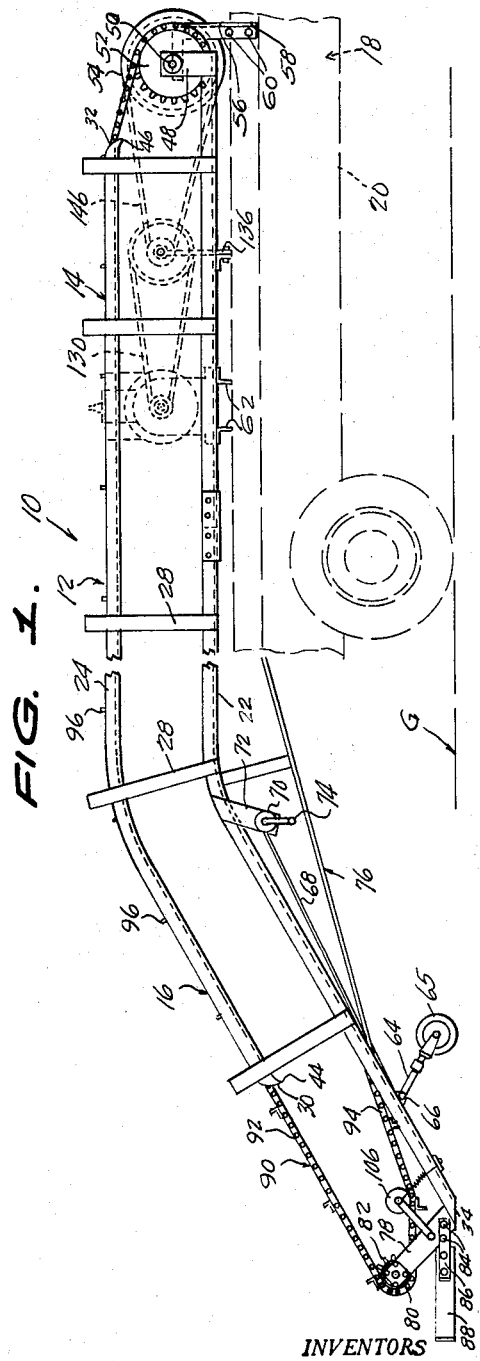
Figure 1 is a longitudinally contracted side elevation of a device of the invention, shown mounted on a truck.

In operation, when the motor 126 is running and the conveyor chains 90 are driven in a counterclockwise direction, as seen in Figure 1, and the truck 18 is moved and steered in a direction to apply the converging plates 88 to material (not shown) on the ground G, the material piles up between the plates 88 and is scooped up by the elevating plate 39 onto the bottom plate 38 to be reached by the raddles 96 on the portions of the lower chain flights 94 which are exposed, as seen in Figure 1, above the lower frame side members 22 and pushed along the bottom plate 38, and the raddles 96 continue to push the material until the material reaches and falls through the discharge slots 118, onto the truck bed 20.

While there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A portable ground cleaner comprising an elongated frame having a horizontal portion to be mounted upon a truck body and a declining portion having an end depressed to engage the ground, a bottom plate extending between the ends of the frame, said bottom plate having an imperforate portion extending along the declining frame portion, and a slotted portion extending along said horizontal frame portion to discharge onto a truck body, laterally spaced endless chains mounted on and extending along said frame, raddles secured to and extending between the chains, said chains having upper flights spaced above said bottom plate and lower flights adjacent to the bottom plate with the raddles of the lower flight running along the upper surface of the bottom plate, and motor means mounted on the frame and operatively connected to the chains, said frame having first and second ends, said first end being at the depressed end of the declining frame portion, and means embodying a transversely disposed shaft on the frame at the second end thereof for mounting the frame on a truck body to swing between elevated and depressed positions relative to the ground.

2. A portable ground cleaner comprising an elongated frame having a horizontal portion to be mounted upon a truck body and a declining portion having an end depressed to engage the ground, a bottom plate extending between the ends of the frame, said bottom plate having an imperforate portion extending along the declining frame portion, and a slotted portion extending along said horizontal frame portion to discharge onto a truck body, laterally spaced endless chains mounted on and extending along said frame, raddles secured to and extending between the chains, said chains having upper flights spaced above said bottom plate and lower flights adjacent to the bottom plate with the raddles of the lower flight running along the upper surface of the bottom plate, and motor means mounted on the frame and operatively connected to the chains, said frame having first and second ends, said first end being at the depressed end of the declining frame portion, and means embodying a transversely disposed shaft on the frame at the second end thereof for mounting the frame on a truck body to swing between elevated and depressed positions relative to the ground, and frame elevating and depressing means comprising a wheel fork pivoted on and depending from the declining frame portion, and means for erecting said wheel fork to elevate the frame.

3. A portable ground cleaner comprising an elongated frame having a horizontal portion to be mounted upon a truck body and a declining portion having an end depressed to engage the ground, a bottom plate extending between the ends of the frame, said bottom plate having an imperforate portion extending along the declining frame portion, and a slotted portion extending along said horizontal frame portion to discharge onto a truck body, laterally spaced endless chains mounted on and extending along said frame, raddles secured to and extending between the chains, said chains having upper flights spaced above said bottom plate and lower flights adjacent to the bottom plate with the raddles of the lower flight running along the upper surface of the bottom plate, and motor means mounted on the frame and operatively connected to the chains, said frame having first and second ends, said first end being at the depressed end of the declining frame portion, and means embodying a transversely disposed shaft on the frame at the second end thereof for mounting the frame on a truck body to swing between elevated and depressed positions relative to the ground, horizontal ground-engaging material converging plates on and extending longitudinally outwardly from said first end of the frame, and ground-engaging material elevating plate means embodying a declining elevating plate on the adjacent end of the bottom plate inwardly of the converging plates.

4. A portable ground cleaner comprising an elongated frame having a horizontal portion to be mounted upon a truck body and a declining portion having an end depressed to engage the ground, a bottom plate extending between the ends of the frame, said bottom plate having an imperforate portion extending along the declining frame portion, and a slotted portion extending along said horizontal frame portion to discharge onto a truck body, laterally spaced endless chains mounted on and extending along said frame, raddles secured to and extending between the chains, said chains having upper flights spaced above said bottom plate and lower flights adjacent to the bottom plate with the raddles of the lower flight running along the upper surface of the bottom plate, and motor means mounted on the frame and operatively connected to the chains, said frame comprising pairs of laterally spaced coplanar upper and lower side members, said side members having vertical flanges and horizontal flanges, said horizontal flanges extending toward each other, means spacing and connecting the upper and lower side members, said bottom plate extending between and spacing and connecting said lower side members, said chains having upper flights riding on the horizontal flanges of the upper side members, with the raddles of the lower flights riding upon the upper surface of the bottom plate, and means mounting the chains on the frame comprisnig a chain driving shaft mounted on the frame at one end thereof and a chain carrying shaft mounted on the other end of the frame, and driving belt means operatively connecting the motor means with the chain driving shaft, said shafts having thereon individual sprocket wheels over which related chains are trained.

References Cited in the file of this patent
UNITED STATES PATENTS 1,861,639    Martin ------------------ June 7, 1932

FOREIGN PATENTS 101,117    Sweden ---------------- Mar. 18, 1941